United States Patent
Kitamura

[11] Patent Number: 5,909,758
[45] Date of Patent: Jun. 8, 1999

[54] SUPPORTING TOOL AND METHOD OF INSTALLING SAME

[76] Inventor: Akio Kitamura, c/o Hokumei Co., Ltd. of 3-12, Shinimazato 1-chome, Ikuno-ku, Osaka-shi, Osaka-fu, JPX, Minoh, Japan

[21] Appl. No.: 08/754,526

[22] Filed: Nov. 21, 1996

[30] Foreign Application Priority Data

Nov. 27, 1995 [JP] Japan ................................. 7-332841
Sep. 12, 1996 [JP] Japan ................................. 8-265528

[51] Int. Cl.⁶ .................................................. A47G 1/17
[52] U.S. Cl. ................ 16/111 R; 248/205.3; 248/205.6; 248/205.8; 248/206.3; 248/544
[58] Field of Search .......................... 16/110 R, 111 R; 248/205.4, 205.6, 206.1, 206.3, 205.3, 205.8; 211/105.1, 105.2, 119

[56] References Cited

U.S. PATENT DOCUMENTS

| | | | |
|---|---|---|---|
| 2,127,154 | 8/1938 | Burk ........................ | 16/110 R |
| 2,165,814 | 7/1939 | Redmond .................. | 248/206.1 |
| 2,451,194 | 10/1948 | Braun ....................... | 248/205.6 |
| 3,020,017 | 2/1962 | Watson ...................... | 248/205.8 |
| 3,180,604 | 4/1965 | Hammer .................... | 248/205.8 |
| 4,133,575 | 1/1979 | Näder ........................ | 248/205.8 |
| 4,390,576 | 6/1983 | Hutter, III ................. | 248/205.3 |
| 4,421,288 | 12/1983 | Blaszkowski .............. | 248/205.4 |
| 4,524,506 | 6/1985 | Wilke ........................ | 248/205.4 |
| 4,822,224 | 4/1989 | Carl et al. .................. | 248/205.3 |
| 4,944,478 | 7/1990 | Sullivan .................... | 248/205.8 |
| 5,349,834 | 9/1994 | Davidge .................... | 248/205.6 |
| 5,593,120 | 1/1997 | Hamerski ................... | 248/205.3 |

FOREIGN PATENT DOCUMENTS

| | | | |
|---|---|---|---|
| 541310 | 5/1957 | Canada ...................... | 248/206.1 |
| 144903 | 4/1954 | Sweden ..................... | 248/206.1 |
| 441647 | 1/1968 | Switzerland ............... | 248/206.1 |

*Primary Examiner*—Chuck Y. Mah
*Assistant Examiner*—Donald M. Gurley
*Attorney, Agent, or Firm*—Graham & James LLP

[57] ABSTRACT

A supporting tool which can be easily mounted at a desired position on a wall surface or the like at a low cost to function as a supporting bar or a handrail includes a sucking pad. An adhesive agent layer is disposed on one main surface of the sucking pad and on a portion of the other main surface, opposed to a pedestal. One end of a shaft shaped connection member is fixed to the other main surface of the sucking pad, whereas the other end of the shaft-shaped connection member penetrates through the center of the pedestal. A horizontal shaft is inserted through the other end of the connection member which extends upward through the upper surface of the pedestal. Each end of the horizontal shaft is rotatably supported by shaft-receiving members. The horizontal shaft is fixed to a rotatable cam. The horizontal shaft is moved vertically by rotating the cam. As a result, the center of the sucking pad is moved vertically through the connection member. The periphery of the sucking pad is pressed against an installation surface by a pressing portion.

5 Claims, 11 Drawing Sheets

SUPPORTING TOOL AND METHOD OF INSTALLING SAME

BACKGROUND OF THE INVENTION

1. Field of the Invention

The present invention relates to a supporting tool and more particularly to a supporting tool which may preferably be used in a bathroom or other room as a supporting bar to be gripped by elderly people, handicapped people, and their care providers so as to support their bodies and also to be used as a handrail to help such people walk and move around the room safely; and a method of installing the supporting tool on a wall or other surface.

2. Description of the Prior Art

FIG. 15A is a sectional view showing an example of a conventional supporting tool. A supporting tool 1 is used as a supporting bar to be held in a person's hand to support his/her body in a bathroom or other room. Ordinarily, the supporting tool 1 is installed on a wall surface W of a bathroom when a house is built. The supporting tool 1 includes a base plate 2. A supporting bar body 3 projects from one main surface of the base plate 2. The supporting bar 3 comprises a supporting member 3a projecting from the base plate 2 at approximately a right angle therewith and a grasping member 3b formed at the leading end of the supporting member 3a and grasped in the person's hand. The supporting tool 1 can be used as a handrail by disposing the long grasping member 3b along a walking path. The base plate 2 of the supporting tool 1 is installed on the wall surface W of the bath room by means of an anchor bolt 4, with the base plate 2 in contact with the wall surface W. In this case, a joist S is mounted at the rear of the wall surface W. In the case of the supporting tool 1 shown in FIG. 15A, the joist S is made of a concrete block. Cement mortar is applied to the surface of the joist S, and the cement mortar is covered with a tile T.

One end of the anchor bolt 4 is fixed to the joist S by screwing it into the joist S through the base plate 2 of the supporting tool 1 and the tile T of the wall surface W. The base plate 2 is fixed to the wall surface W by tightening a nut 4a positioned at the other end of the anchor bolt 4 on the base plate 2. The one main surface of the base plate 2 is covered with a decorative flange 5 to cover the other end of the anchor bolt 4 and the nut 4a.

In the above example, instead of the anchor bolt, screws or nails may be used to fix supporting tools 1 to the wall surface W. The joist S shown in FIG. 15B is made of wood. A board which is commonly referred to as a composite panel is bonded to the surface of the joist S. Cement mortar is applied to the surface of the board. The cement mortar is covered with a tile T. The supporting tool 1 is fixed to the wall surface W by means of a wooden screw 6 tightened into the joist S.

FIG. 15C shows a case in which the supporting tool 1 is installed on a wall surface W of an FRP of a built-in bus (unit-bus). In this case, the joist S into which a bolt or the like is screwed is not mounted inside the wall surface W. Thus, in order to install the supporting tool 1 on the wall surface W, it is necessary to fasten the supporting tool 1 by means of a bolt and nut at both sides of the wall surface W through an iron plate or the like.

FIG. 16A is a sectional view showing another example of a conventional supporting tool. The supporting tool 6 is installed at a corner of a bath tub B without forming a hole in the bath tub B to avoid water leakage. The supporting tool 6 includes a base plate 7 having an approximately U-shaped cross section. The base plate 7 is installed on the corner of the bath tub B by fitting the corner of the bath tub B into the base plate 7. A screw 8 installed on the side wall of the base plate 7 is tightened through the base plate 7 and the wall of the bath tub B. In this manner, the wall of the bath tub B is sandwiched between the leading end of the screw 8 and the inner surface of the base plate 7 having the approximately U-shaped cross section.

When it is necessary to install a conventional supporting tool as shown in FIGS. 15A through 15C in a bathroom as a supporting bar or a handrail several years after a house is built, a hole must be formed in a wall of the bathroom with an expensive special drill. Because tiles are slippery and easily broken, professional skill is required to make the hole in the tile at a desired position. Thus, it is necessary to have a professional person do the supporting tool installation work, which makes the cost of the installation work high. There are occasions when even the professional person must make holes in order to check whether the joist S is mounted at a position where the supporting tool 1 is to be installed. Further, if the joist S is made of wood, it may have rotted. In this case, the supporting tool 1 cannot be installed with a desired stability even though the anchor bolt 4 is tightened on the joist S. Moreover, the supporting tools 1 as shown in FIGS. 15A through 15C require a hole to be formed on an installation surface. Therefore, it is impossible to install the supporting tool 1 on the bath tub B without causing water leakage. For the reason described above, it is difficult for a user to install the conventional supporting tools at a desired position. In addition, for the reasons described above, there is a possibility that the professional person will not accept a request for the installation of the supporting tool 1 if the request is made several years after a house is constructed because of the potential for excessive damage caused by the installation.

Moreover, the supporting tool 6 as shown in FIG. 16A cannot be installed on the corner of the bath tub B if the thickness of the wall at the corner is changed greatly. Furthermore, if a floor F is continuous with the upper surface of the bath tub B, as shown in FIG. 16B, the supporting tool 6 cannot be installed on the corner of the bath tub B because the thickness of the corner is too large.

SUMMARY OF THE INVENTION

The preferred embodiments of the present invention overcome the disadvantages of the conventional devices described above by providing a supporting tool which is adapted to be easily and inexpensively installed on a wall or other surface to function as a supporting bar or a handrail at a desired position even after a house has been constructed.

A supporting tool of the preferred embodiments of the present invention comprises a sucking pad removably suction-mounted to an installation surface such as a wall surface or the like; a shaft-shaped connection member having a first end extending substantially vertically from one main surface of the sucking pad; a pedestal connected to a second end of the connection member and arranged to cover the one main surface of the sucking pad; a supporting bar body which projects from one main surface of the pedestal and is arranged to be grasped by a person; and an adhesive agent layer disposed on both main surfaces of the sucking pad for fixing the pedestal or the sucking pad to the installation surface.

As a result, the sucking pad of the supporting tool can be suction-mounted to an installation surface at a predetermined position. Therefore, even though the viscosity of the adhesive agent is low because it is not hardened, the supporting tool can be held at the predetermined position by means of the sucking pad until the adhesive agent is dried/hardened. That is, the supporting tool can be prevented from being dislocated from the installed position. After the adhesive agent layer is dried/hardened, the supporting tool can be fixed to the installation position with a higher degree of strength. Further, the adhesive agent layer allows the installation surface to be smooth, thus permitting the sucking pad to be bonded and suction-mounted to the installation surface with a high degree of adhesive and sealing strength. Therefore, the sucking pad can be suction-mounted to the installation surface even though the installation surface has an irregular shape or surface characteristic. After the adhesive agent is dried/hardened, the supporting tool can be fixed to the installation surface firmly.

A supporting tool according to a preferred embodiment of the present invention comprises a sucking pad which is elastic and has a first main surface which is adapted to be removably suction-mounted to an installation surface; a shaft-shaped connection member having a first end extending substantially vertically from a second main surface of the sucking pad; a pedestal having a pressing portion including an annular projection member which presses a periphery of the sucking pad and through which the connection member is inserted; a supporting bar body having a first end which is fixed to a surface of the pedestal disposed opposite to a sucking pad-located side and which is grasped by a person; and an adhesive agent layer disposed on at least one main surface of the sucking pad for fixing the sucking pad to the installation surface. In this preferred embodiment, a rotary cam member is rotated such that a periphery of the sucking pad is pressed against the installation surface by the pressing portion to move the connection member in an upward direction toward an upper surface of the pedestal. As a result, the sucking pad is elastically deformed to form a negative pressure portion, with the adhesive agent layer interposed between the installation surface and the sucking pad.

In this case, in addition to the above-described effect, the sucking pad is elastically deformed when the cam is rotated to move the connection member upward toward the upper surface of the pedestal. As a result, the negative pressure portion is formed between the sucking pad and the installation surface, with the adhesive agent layer interposed between the installation surface and the sucking pad. Although the adhesive agent layer is interposed between the installation surface and the sucking pad, the sucking or suction force of the sucking pad can be increased by forming the negative pressure portion.

According to another preferred embodiment of the present invention, a method of installing a supporting tool on an installation surface to which a sucking pad of the supporting tool is removably suction-mounted includes the steps of determining a position on which the supporting tool is to be installed, temporarily attaching the supporting tool on the installation surface by means of the sucking pad; removing the supporting tool from the installation surface after imparting a mark at the determined position and applying adhesive agent to an installation side of the sucking pad; and suction-mounting the installation side of the sucking pad having the adhesive agent applied thereon to the marked position and drying or hardening the adhesive agent.

According to this preferred method, the supporting tool can be removably mounted on the installation surface by means of the sucking pad even though the sucking pad does not have any adhesive agent disposed thereon. Thus, the most suitable installation position of the supporting tool can be determined without forming a hole in the installation surface or damaging it. Thereafter, the sucking pad is preferably coated with adhesive agent and the supporting tool is bonded to the desired position on the installation surface. In this manner, the supporting tool can be fixed to a desired position on a surface.

A supporting tool according to the preferred embodiments of the present invention comprises a base plate which is adapted to be installed on an installation surface such as a wall surface or the like, with the substrate in contact with the installation surface; a supporting bar body which projects from one main surface of the base plate and is adapted to be grasped by a person; and an adhesive member disposed on the other main surface of the base plate for fixing the base plate to the installation surface.

In this case, the supporting tool can be firmly fixed to the installation surface such as a wall surface by means of the adhesive member disposed on the other main surface of the base plate. Accordingly, the supporting tool can be easily mounted at a desired position of the wall surface or the like at a low cost even by a person unskilled in installing work, after a house is built. Thus, people can hold the supporting tool body in their hands as a supporting tool or a handrail.

According to the preferred embodiments of the present invention, the adhesive member preferably includes a base material; a first adhesive agent layer disposed on one main surface of the base material and fixing the base material to the base plate; and a second adhesive agent layer disposed on the other main surface of the base material and fixing the base material to the installation surface.

In this case, the base material interposed between the first adhesive agent layer and the second adhesive agent layer functions as a cushioning material, thus increasing the resistance against a momentary force applied to the supporting tool body. Further, the first adhesive agent layer is preferably formed of an adhesive agent which is suitable for adhering to the base plate, and the second adhesive agent layer is preferably formed of an adhesive agent which is suitable for adhering to the installation surface. Therefore, even though the adhesive property of the base plate and that of the installation surface are different from each other, the fixing strength of the supporting tool can be improved by selecting an appropriate adhesive agent.

Further, according to the preferred embodiments of the present invention, the adhesive member includes a bonding material disposed on a part of the other main surface of the base plate for attaching the base plate to the installation surface temporarily; and an adhesive agent which is formed on a part of the other main surface of the base plate such that the adhesive agent is positioned in an area other than the area occupied by the bonding material and which fixes the base plate to the installation surface. The bonding material preferably includes a base material; a first adhesive agent layer disposed on one main surface of the base material and fixing the base material to the base plate; and a second adhesive agent layer disposed on the other main surface of the base material and including a pressure-sensitive adhesive agent for fixing the base material to the installation surface.

In this case, the base plate can be attached to the installation surface at a predetermined position thereof via the bonding material. Therefore, even though the viscosity of the adhesive agent is low because it is not hardened, the supporting tool can be held at the predetermined position via the bonding material until the adhesive agent is dried/hardened.

That is, the supporting tool can be prevented from being dislocated from the installed position. After the adhesive agent layer is dried/hardened, the supporting tool can be fixed to the installation position with a higher degree of strength in cooperation of the bonding material and the adhesive agent.

The supporting tool of the preferred embodiments of the present invention can be easily mounted at a desired position of a wall surface or the like at a low cost even by a person unskilled in installing work after a house is built and can be utilized as a supporting bar or a handrail.

A person's body can be supported by the supporting tool installed at a desired location by grasping it. Accordingly, the person can get into a bathroom or get out from the bathroom safely by installing the supporting tool at a position close to a slippery entrance of the bath room. Further, people can grasp the supporting tool installed on the wall surface of the bathroom when they stand up. Furthermore, the supporting tool mounted in a bath tub allows them to enter a bath tub and get out from it safely. In addition, it can be utilized as a handrail by mounting it along a walk path in the bathroom so that people can use the supporting tool to walk safely. Further, the supporting tool can be easily installed on an aluminum sash frame of a door or on the windowpane thereof as a supporting bar without forming a hole thereon, which will allow them to open and close the door easily. As described above, the supporting tool can be conveniently utilized by children, old people, handicapped people when they take a bath. It can help care providers in taking care of old people, handicapped people or the like.

Furthermore, it is unnecessary to use special tools to install the supporting tool at a desired position on a surface. Thus, even unskilled person can easily install the supporting tool at a desired position at a low cost. In addition, because it is not necessary to form a hole on the desired position, water leakage is not a concern when installing the supporting tool on a bath tub.

The above and further objects, features, aspects, and advantages of the present invention will be more fully apparent from the following detailed description of the preferred embodiments of the present invention shown in the accompanying drawings.

DESCRIPTION OF PREFERRED EMBODIMENTS

Figure 1:
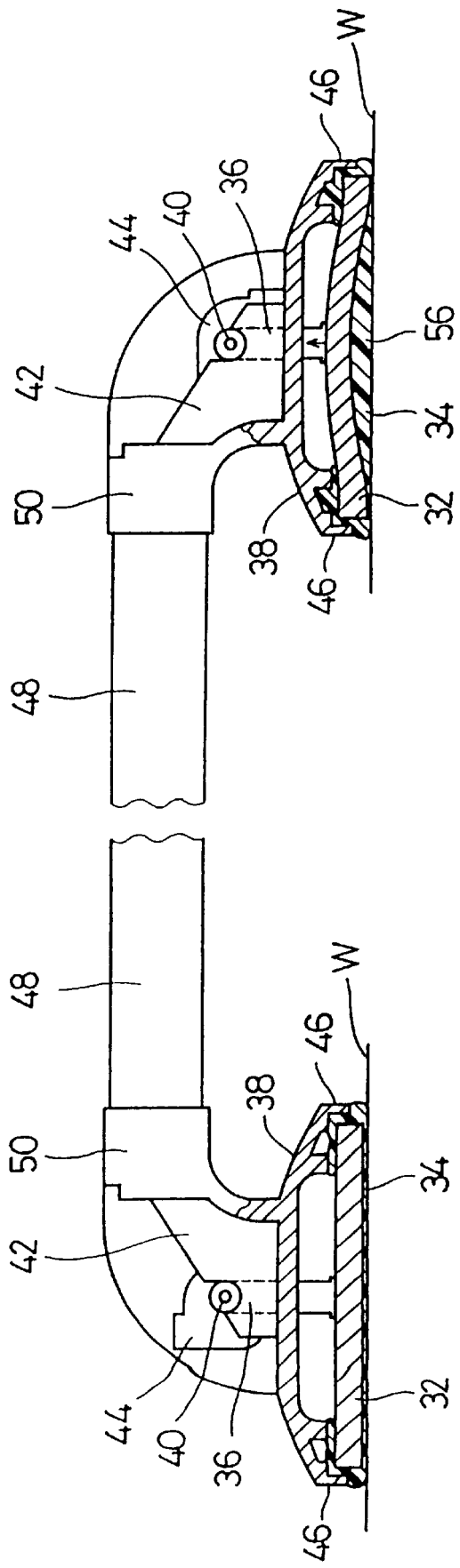
FIG. 1 is a partial section view showing a supporting tool, according to a preferred embodiment of the present invention.

FIG. 1 is an illustration showing a supporting tool, according to a preferred embodiment of the present invention.

In the state shown at the left-hand side in FIG. 1, a sucking pad 32 is not suction-mounted to an installation surface, whereas in the state shown at the right-hand side in FIG. 1, the sucking pad 32 is suction-mounted to the installation surface.

A supporting tool 30 preferably includes a substantially circular sucking pad 32. The sucking pad 32 is preferably made of an elastic material, for example, rubber. An adhesive agent layer 34 is preferably formed on one main surface of the sucking pad 32 and on a portion, of the other main surface, opposed to a pedestal 38 which will be described later.

One end of a shaft-shaped connection member 36 is fixed to the other main surface of the sucking pad 32. The one end of the connection member 36 also may be fixed to the inside of the sucking pad 32.

The connection member 36 extends substantially vertically from the other main surface of the sucking pad 32, thus penetrating through the pedestal 38 substantially at its center.

The pedestal 38 is preferably disc-shaped in a plan view and looks like an upside-down cup. The pedestal 38 is installed on the installation surface such that the sucking pad 32 is covered by the pedestal 38. A horizontal shaft 40 extending substantially parallel to the installation surface is inserted through the other end of the connection member 36 extending upward from the upper surface of the pedestal 38. Each end of the horizontal shaft 40 is rotatably supported by each of approximately triangular horizontal shaft-receiving members 42 and 42. The horizontal shaft-receiving members 42 and 42 are preferably integral with the upper surface of the pedestal 38.

A cam 44 serving as a rotary member is installed between the horizontal shaft-receiving members 42 and 42. The horizontal shaft 40 is fixed to an eccentric portion of the cam 44. When the cam 44 is rotated, the horizontal shaft 40 moves vertically in FIG. 1. In unison with the vertical movement of the horizontal shaft 40, the connection member 36 moves vertically in FIG. 1. In unison with the vertical movement of the connection member 36, the center portion of the sucking pad 32 fixed to one end of the connection member 36 moves vertically.

As shown in FIG. 2, an operation rod 44a is temporarily inserted into the cam 44 to rotate the cam 44. After the cam 44 is rotated, the operation rod 44a is removed from the cam 44.

A substantially annular pressing portion 46 projects downward from the periphery of the pedestal 38 toward the sucking pad 32. The pressing portion 46 is used to press the periphery of the sucking pad 32 against the installation surface so as to attach the tool 30 closely and securely to the installation surface.

A supporting bar-receiving member 50 for holding one end of a rod-shaped supporting bar member 48 to be grasped by a person extends upward from the upper surface of the pedestal 38. The supporting bar-receiving member 50 is approximately L-shaped in a side view and integral with the pedestal 38. The supporting bar-receiving member 50 has at the other end thereof a concave portion 50a into which the supporting bar member 48 is inserted.

The supporting tool 30 includes a cover 52 (shown in FIG. 10) for covering the connection member 36 installed on the pedestal 38, the horizontal shaft 40, the horizontal shaft-receiving members 42 and 42, and the cam 44. The cover 52 is preferably installed on the pedestal 38 at the final stage of the installation work which will be described later.

A preferred method of installing the supporting tool 30 on an installation surface will be described below.

Figure 3:
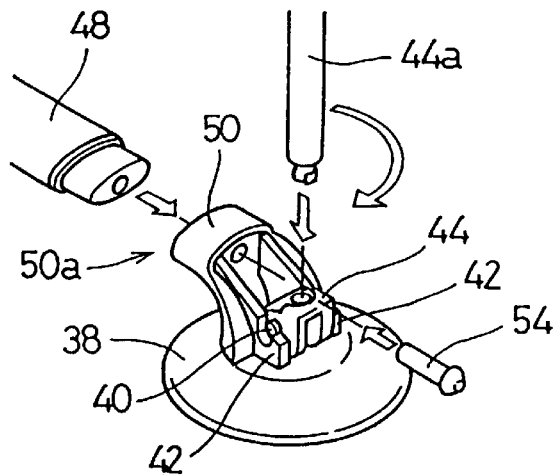
FIG. 3 is a perspective view showing a method of installing the supporting tool, according to the preferred embodiment shown in FIG. 1, on an installation surface.

As shown in FIG. 3, initially, the supporting bar member 48 is inserted into the supporting bar-receiving member 50 and temporarily fixed thereto with a screw 54 to adjust an installation angle relative to the installation surface by allowing the pedestal 38 to rotate around the supporting bar member 48.

The operation rod 44a is fixed to the cam 44 temporarily by rotating the operation rod 44a by about 90°, with one end thereof inserted into the cam 44. At this time, as shown in FIG. 2 (A), the operation rod 44a is temporarily installed on the cam 44, with the operation rod 44a being arranged substantially perpendicular to the upper surface of the pedestal 38. At this time, the sucking pad 32 is not elastically deformed.

Figure 4:
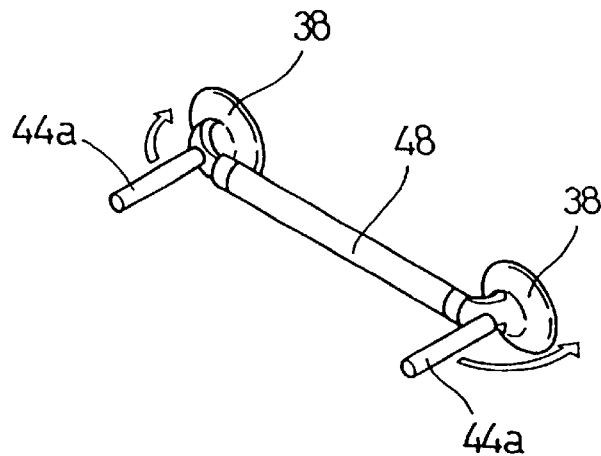
FIG. 4 is the perspective view showing a method of installing the supporting tool, according to the preferred embodiment shown in FIG. 1, on the installation surface.

Then, as shown in FIG. 4, one main surface of the sucking pad 32 is brought into contact with the installation surface, for example, a wall surface of a bath room or other room. Because the sucking pad 32 has not been suction-mounted to the installation surface at this time, the installation position of the supporting tool 30 can be altered to find the best installation position on the wall surface.

When the supporting tool 30 is installed on the installation surface temporarily, the operator presses the supporting tool 30 against the installation surface by gripping the supporting bar member 48 so that the pressing portion 46 of the pedestal 38 presses the periphery of the sucking pad 32 against the installation surface. Consequently, the sucking pad 32 is closely attached to the installation surface.

Then, as shown by an arrow of FIG. 4, the operator pivots the operation rod 44a substantially parallel to the installation surface to rotate the cam 44. As a result, as shown in FIG. 2B, the connection member 36 is moved in an upward direction toward the upper surface of the pedestal 38, and in unison with the upward movement of the connection member 36, the center portion of the sucking pad 32 is elastically deformed. At this time, a negative pressure portion 56 having a pressure lower than the atmospheric pressure is formed between the sucking pad 32 and the installation surface, because the sucking pad 32 is closely attached to the installation surface by the pressing force of the pressing portion 46 applied to the periphery of the sucking pad 32, as described previously. In this manner, the sucking pad 32 can be firmly suction-mounted to the installation surface and used as a supporting bar or a handrail temporarily.

If it is found later that there is an inconvenience at the installation position, the operation rod 44a is pivoted vertically with respect to the installation surface to rotate the cam 44. As a result, the connection member 36 is moved downward toward the sucking pad 32, thus eliminating the negative pressure portion 56 and bringing the sucking pad 32 into an unsuctioned state. The best installation position of the supporting tool 30 can be determined by repeating these operations.

Figure 5:
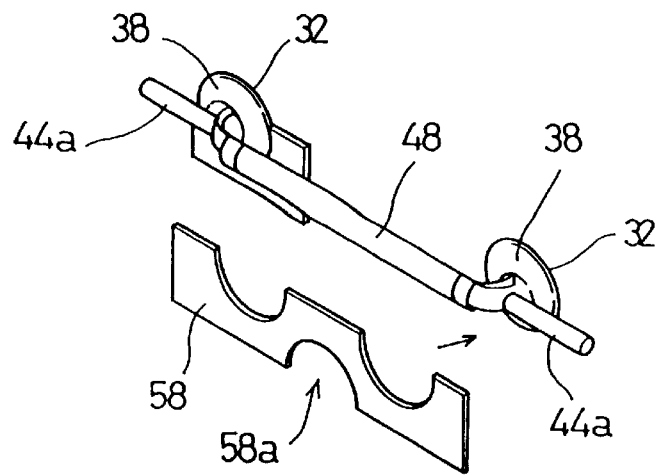
FIG. 5 is the perspective view showing a method of installing the supporting tool, according to the preferred embodiment shown in FIG. 1, on the installation surface.

As shown in FIG. 5, a positioning member 58 may preferably be mounted on the installation surface to function as a mark or locating member to be used when the supporting tool 30 which has been temporarily inserted is to be removed from the installation surface. The positioning member 58 includes a base plate on which a plurality of concave portions 58a each having a shape substantially corresponding to a shape of the sucking pad 32 is formed. A double-sided adhesive tape is adhered to a side of the positioning member 58 that is to be mounted on the installation surface so that the positioning member 58 is temporarily adhered to the installation surface with the double-sided adhesive tape. This double-sided adhesive tape has a re-releasable and re-adhesive agent at least on a rear surface of thereof. The concave portion 58a of the positioning member 58 is removably bonded to the installation surface at the position of the sucking pad 32. After the positioning member 58 is installed at an installation position of the supporting tool 30, the supporting tool 30 is removed temporarily from the installation surface by eliminating the negative pressure portion 56.

Figure 6:
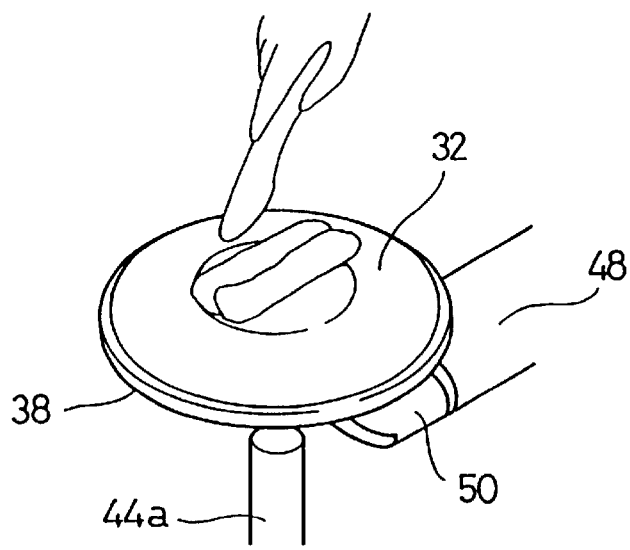
FIG. 6 is the perspective view showing a method of installing the supporting tool, according to the preferred embodiment shown in FIG. 1, on the installation surface.
Figure 7:
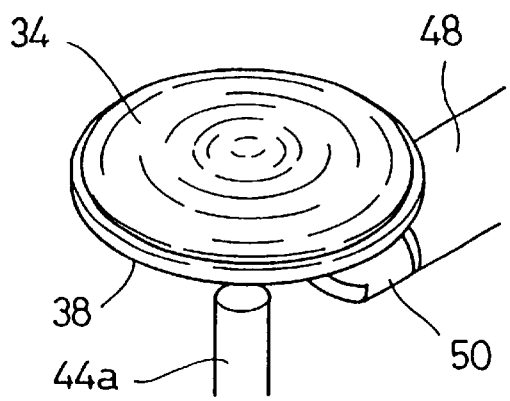
FIG. 7 is the perspective view showing a method of installing the supporting tool, according to the preferred embodiment shown in FIG. 1, on the installation surface.
Figure 8:
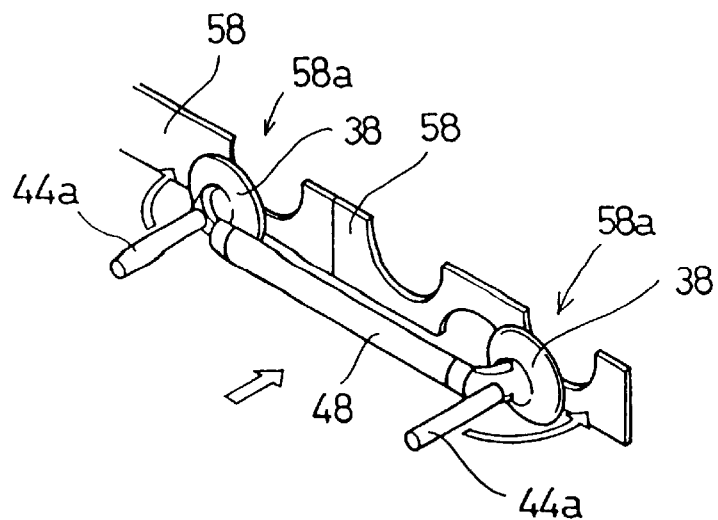
FIG. 8 is the perspective view showing a method of installing the supporting tool, according to the preferred embodiment shown in FIG. 1, on the installation surface.
Figure 9:
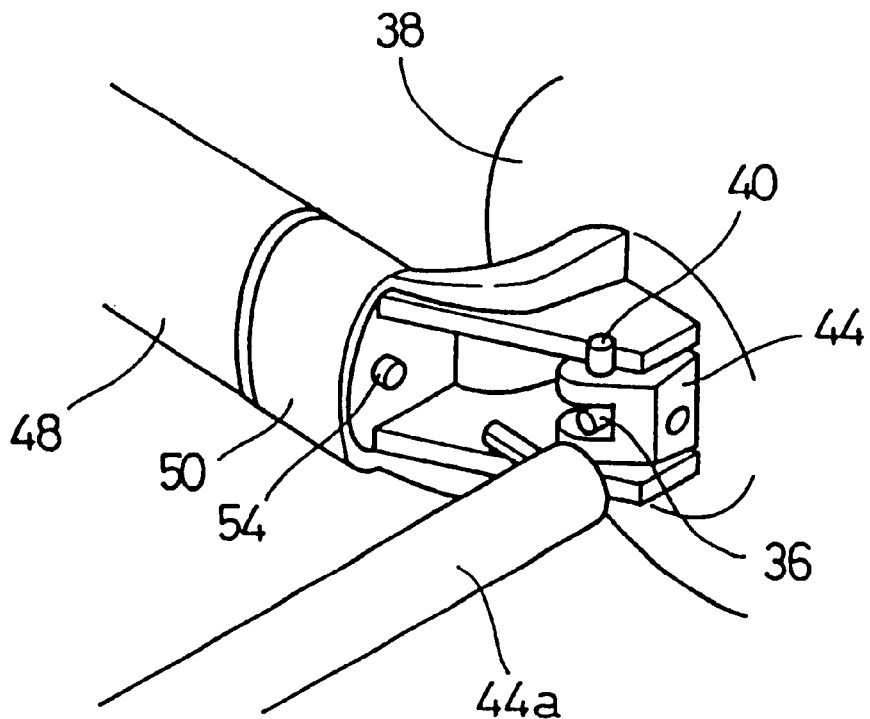
FIG. 9 is the perspective view showing a method of installing the supporting tool, according to the preferred embodiment shown in FIG. 1, on the installation surface.

Then, as shown in FIG. 6, adhesive agent is preferably applied to one main surface of the sucking pad 32 and on portions, of the other main surface thereof, opposed to the pedestal 38. Then, as shown in FIG. 7, the sucking pad 32 is uniformly coated with the adhesive agent. As the adhesive agent, two-part elastic adhesive agent TB3951 having a high degree of release manufactured by Three Bond Co., Ltd. can be used. As shown in FIG. 8, the supporting tool 30 is installed again at a position to which the positioning member 58 has been temporarily attached.

Figure 2A:
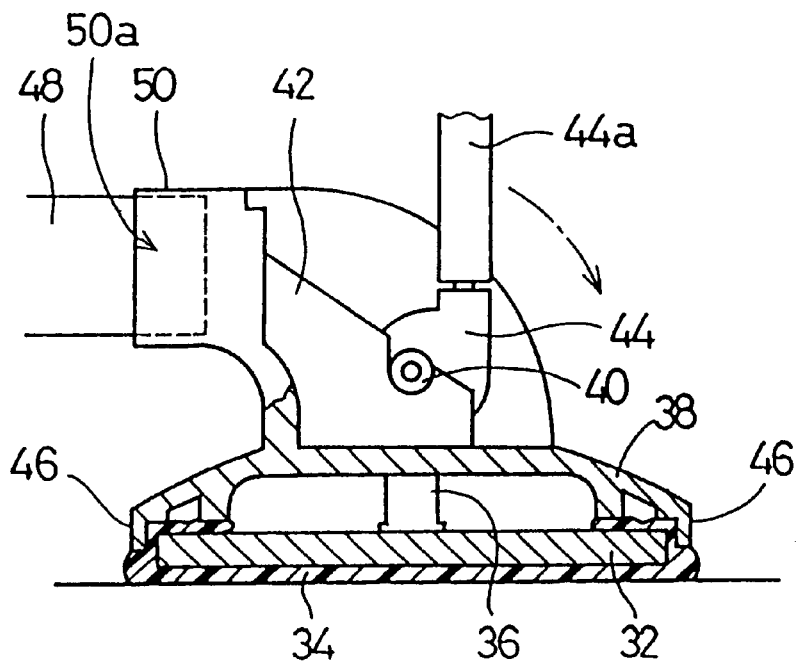
FIG. 2A is an illustration showing the supporting tool, according to the preferred embodiment shown in FIG. 1, in a state before a negative pressure portion is formed therein.
Figure 2B:
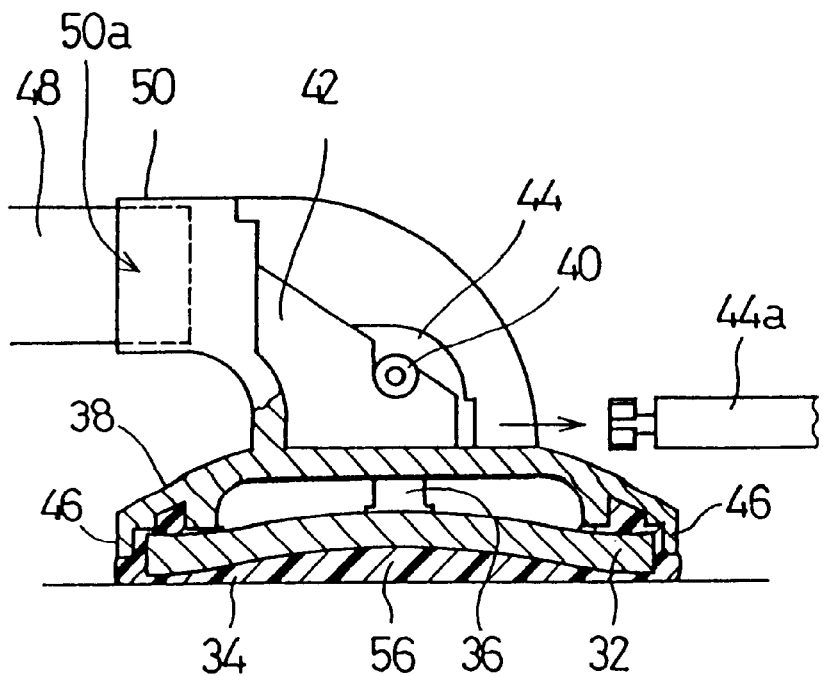
FIG. 2B is an illustration showing the supporting tool, according to the preferred embodiment shown in FIG. 1, in a state after the negative pressure portion is formed therein.

In this case, as shown in FIG. 2A, the sucking pad 32 is brought into contact with the installation surface, with the operation rod 44a being disposed substantially vertical with respect to the installation surface. The adhesive agent layer 34 is arranged between the sucking pad 32 and the installation surface. Then, as shown in FIG. 2B, the operation rod 44a is pivoted so that the operation rod 44a is substantially parallel to the installation surface. As a result, the cam 44 is rotated to create the negative pressure portion 56. Consequently, the sucking pad 32 is suction-mounted to the installation surface, thus holding the supporting tool 30 on the installation surface until the adhesive agent layer 34 is hardened. At this time, excess adhesive agent which has been pressed out on the installation surface and on the sucking pad 32 because the sucking pad 32 has been pressed against the installation surface can be accommodated in the negative pressure portion 56 and the space between the pedestal 38 and the other main surface of the sucking pad 32. As a result, the supporting tool 30 installed on the installation surface has an excellent surface finish.

The operation rod 44a is not required after the sucking pad 32 is suction mounted to the installation surface, with the adhesive agent layer 34 interposed between the installation and the sucking pad 32. Therefore, the rod 44a is removed from the cam 44. A hexagon wrench or other suitable tool is mounted on the other end of the operation rod 44a so that the screw 54 is completely tightened by means of the hexagon wrench or other suitable tool to fix the supporting bar member 48 to the supporting bar-receiving member 50 completely.

After the installation position of the supporting tool 30 is determined, the positioning member 58 can be removed therefrom.

Because the adhesive agent layer 34 of this preferred embodiment preferably comprises an adhesive agent of a two-part hardening type, the adhesive agent layer 34 is completely hardened after a predetermined period of time. After the adhesive agent layer 34 is hardened, the sucking pad 32 and the pedestal 38 are firmly fixed to the installation surface, and the sucking pad 32 and the pedestal 38 are firmly fixed to each other by means of the adhesive agent. Further, because the adhesive agent layer 34 of this preferred embodiment has rubber elasticity, it is resistant to shock.

Figure 10:
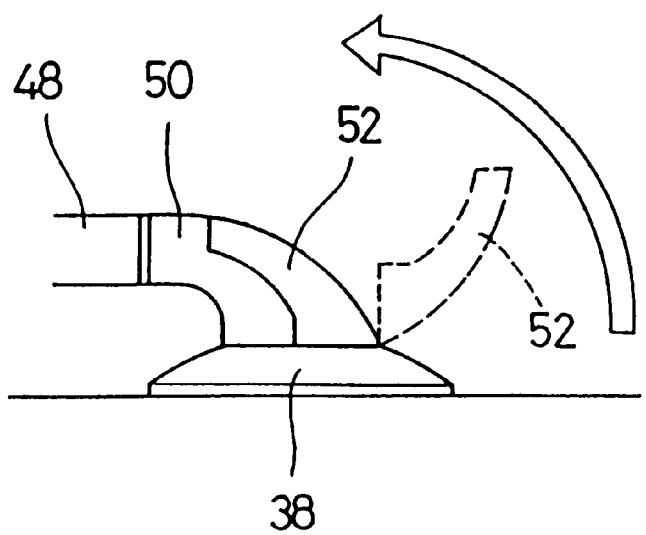
FIG. 10 is the perspective view showing a method of installing the supporting tool, according to the preferred embodiment shown in FIG. 1, on the installation surface.

Then, as shown in FIG. 10, the cover 52 for covering the connection member 36, the horizontal shaft 40, the horizontal shaft-receiving member 42, the cam 44, and the screw 54 is installed on the pedestal 38 so that the appearance of the supporting tool 30 is beautiful.

Figure 11:
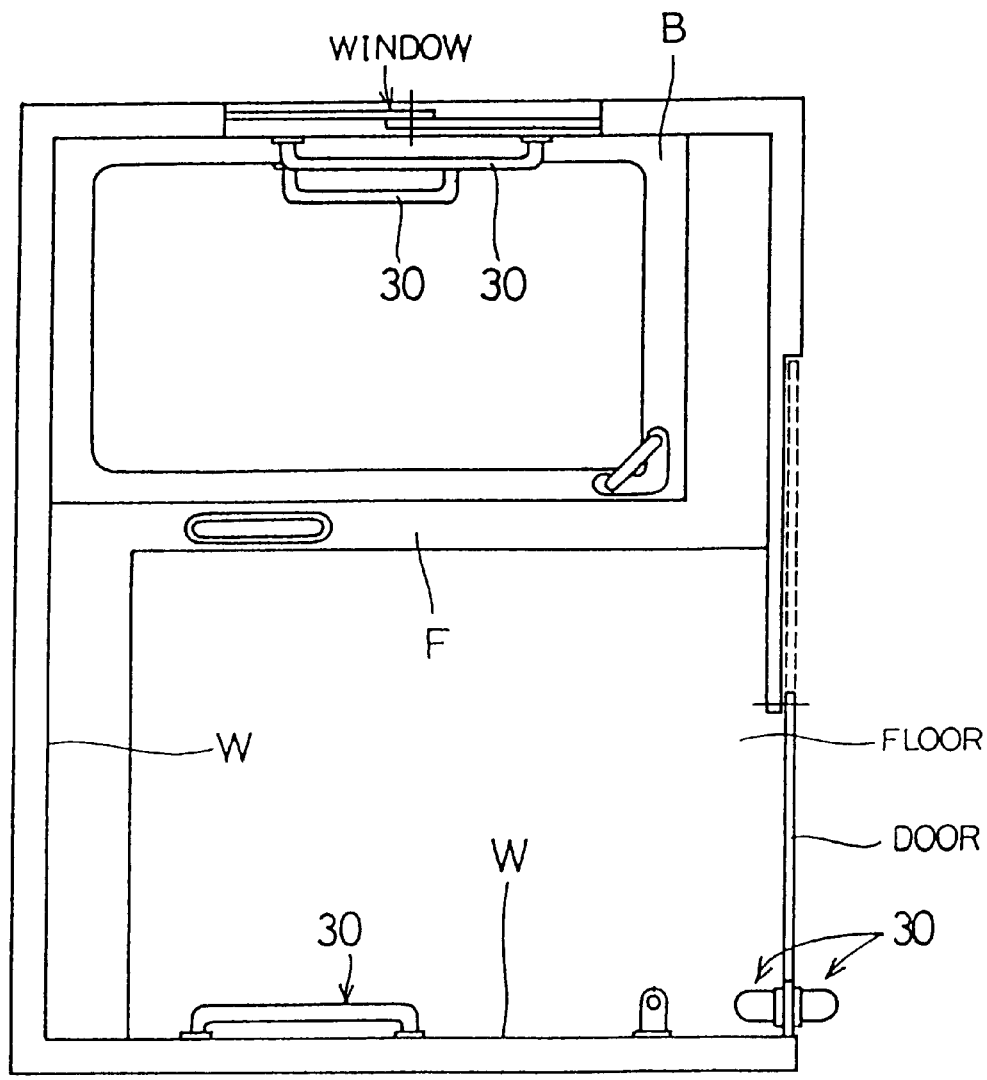
FIG. 11 is a plan view showing a bath room in which the supporting tool shown in FIG. 1 is installed on the wall of the bath room.

FIG. 11 is a plan view showing a bath room in which the supporting tool 30 shown in FIG. 1 may be installed. The supporting tool 30 can be easily installed on a wall of the bath room or a bath tub without forming a hole thereon. In addition to the effect similar to that of a preferred embodiment, shown in FIG. 12, which will be described later, the sucking pad 32 of the supporting tool 30 can be suction-mounted on an installation surface at a predetermined position. Therefore, even though the viscosity of the adhesive agent is low because it is not hardened, the supporting tool 30 can be held at the predetermined position via the sucking pad 32 until the adhesive agent is dried/hardened. That is, the supporting tool 30 can be prevented from being dislocated from the installation position. After the adhesive agent layer 34 is dried/hardened, the supporting tool 30 can be fixed to the installation position with a higher degree of strength. Because the sucking pad 32 is suction-mounted on the installation surface with a high degree of strength, the supporting tool 30 can be installed on a vertical wall surface without being dislocated from the installation position.

In the supporting tool 30, the sucking pad 32 is elastically deformed when the cam 44 is rotated to move the connection member 36 in an upward direction toward the upper surface of the pedestal 38. As a result, the negative pressure portion 56 is formed between the sucking pad 32 and the installation surface, with the adhesive agent layer 34 interposed between the installation surface and the sucking pad 32. Although the adhesive agent layer 34 is interposed between the installation surface and the sucking pad 32, the suction force of the sucking pad 32 can be increased by the formation of the negative pressure portion 56. The adhesive agent layer 34 allows the installation surface to be smooth, thus permitting the sucking pad 32 to be bonded and suction-mounted to the installation surface with a high degree of adhesive and sealing strength. Therefore, the sucking pad 32 can be reliably and securely suction-mounted to the installation surface even though the installation surface has an irregular surface. After the adhesive agent is dried/hardened, the supporting tool 30 is fixed to the installation surface firmly.

In the preferred embodiment shown in FIG. 1, the supporting tool 30 can be removably mounted on the installation surface by means of the sucking pad 32 without having any adhesive agent applied thereon. Thus, the most suitable installation position of the supporting tool 30 can be determined without forming a hole on the installation surface or damaging it. Thereafter, the sucking pad 32 is preferably coated with adhesive agent, and then, the supporting tool 30 can be bonded to the desired position on the installation surface. In this manner, the supporting tool 30 can be fixed to the best position.

Figure 12:
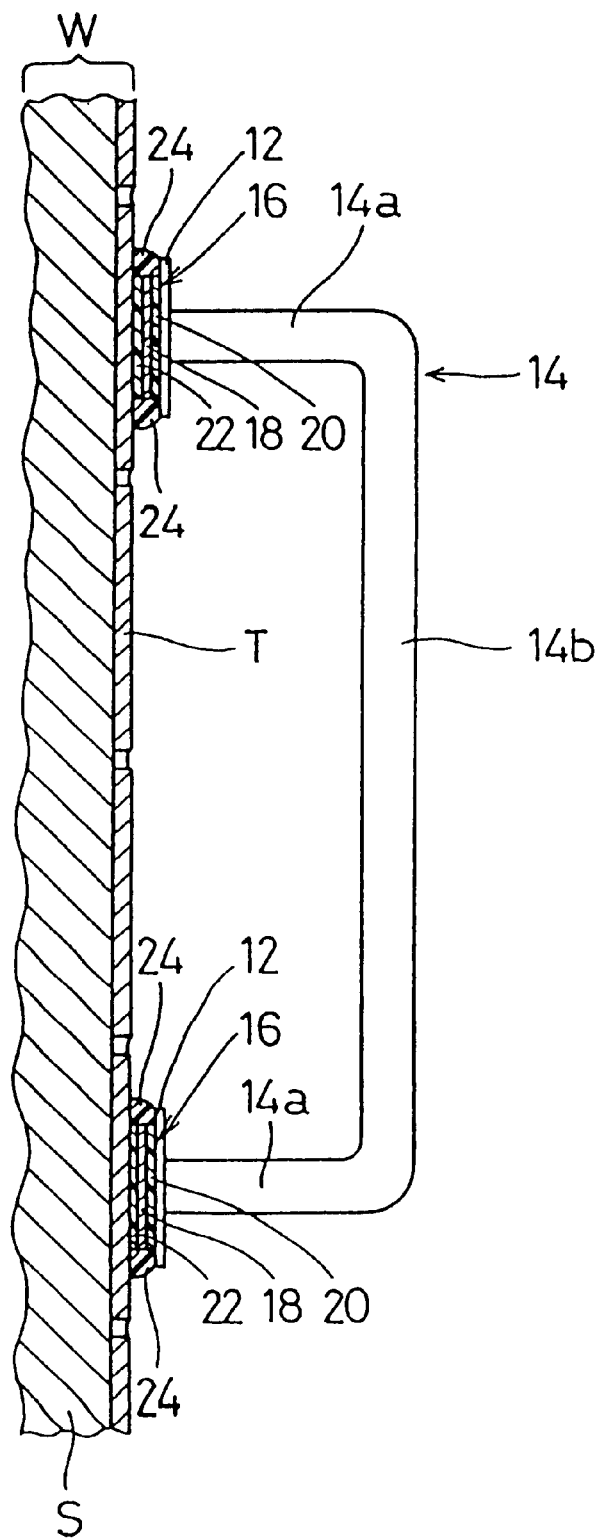
FIG. 12 is an illustration showing a supporting tool according to another preferred embodiment of the present invention.
Figure 13:
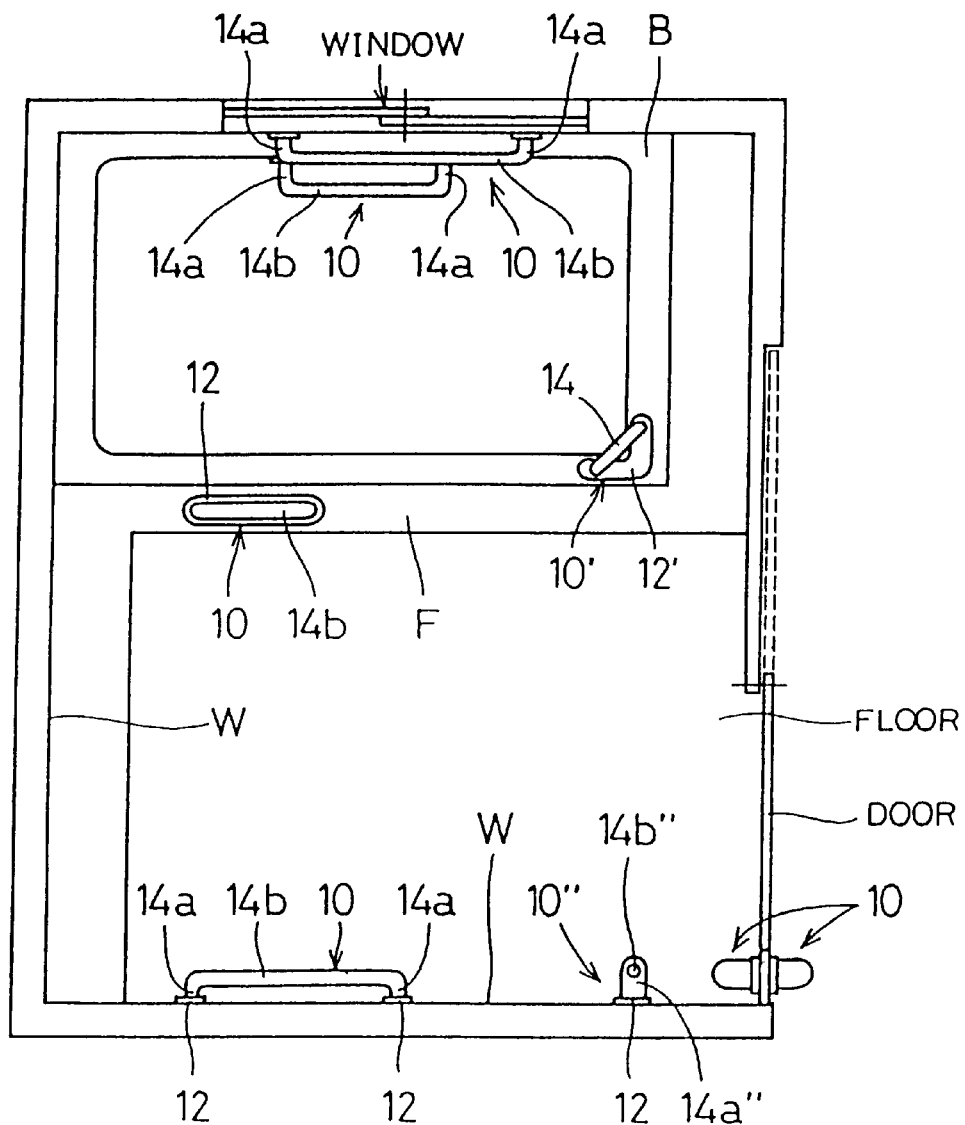
FIG. 13 is a plan view showing a bath room in which the supporting tool shown in FIG. 12 is installed on the wall of the bath room.

FIG. 12 is an illustration showing a supporting tool according to another preferred embodiment of the present invention. FIG. 13 is a plan view showing a bath room in which the supporting tool shown in FIG. 12 is installed on the wall of the bath room. A supporting tool 10 includes two base plates 12 and 12 preferably made of metal such as stainless steel. The base plates 12 and 12 are approximately circular in a plan view.

The supporting tool 10 includes a supporting bar body 14 preferably made of metal such as stainless steel and being approximately U-shaped in a plan view. The supporting bar body 14 has two supporting members 14a and 14a projecting from one main surface of each of the base plates 12 and 12. In this example, the supporting member 14a and the base plate 12 are fixed to each other preferably by means of welding.

The supporting bar body 14 has a gripping member 14b to be grasped by a user. The gripping member 14b is substantially parallel with the main surface of the base plates 12 and 12, and each of both ends of the gripping member 14b is supported by each of the two supporting members 14a and 14a. The length of the gripping member 14b is adjusted depending on the purpose of use. A rod-shaped material is bent preferably in the shape of a "U" as shown in FIG. 12 to form the supporting members 14a and 14a and the gripping member 14b integral with supporting members 14a and 14a.

A bonding material 16 serving as a bonding means is formed on the other main surface of the base plate 12. The bonding material 16 includes a base material 18. The base material 18 is preferably made of a plastic film and has a shape and a size approximately the same as those of the base plate 12. A first adhesive agent layer 20 is formed on one main surface of the base material 18. The base material 18 is firmly fixed to the base plate 12 by means of the first adhesive agent layer 20. A second adhesive agent layer 22 is formed on the other main surface of the base material 18. The base material 18 is firmly fixed to the installation surface by means of the second adhesive agent layer 22. Accordingly, the supporting tool 10 can be firmly fixed to the installation surface by bonding it to the installation surface and by pressing the second adhesive agent layer 22 against the installation surface. Preferably, the first adhesive agent layer 20 is resistant to moisture and heat and its adhesive property is so high that the base plate 12 and the base material 18 can be bonded easily thereto. Preferably, the second adhesive agent layer 22 is resistant to moisture and heat and its adhesive property is so high that the base material 18 and the installation surface can be bonded easily thereto. The first adhesive agent layer 20 and the second adhesive agent layer 22 may include different adhesive agents or the same adhesive agent if the adhesive agents satisfy the above-described conditions. As the bonding material 16 including the first adhesive agent layer 20 and the second adhesive agent layer 22, VHB acrylic foam bonding agent Y-4950 manufactured by Sumitomo 3M Co., Ltd. or a building double-sided adhesive tape HJ-9210 which is durable and highly resistant to load and manufactured by Nitto Denko Co., Ltd. can be preferably used.

In this preferred embodiment, as shown in FIG. 12, a waterproof material 24 such as silicon sealing material is preferably applied to the space between the periphery of the base plate 12 of the supporting tool 10 and the installation surface. As the waterproof material 24, silicon sealant manufactured by Cemedyne Co., Ltd. can be selected. The application of the waterproof material 24 thereto prevents water from penetrating thereinto, thus improving the durability of the bonding material 16.

A supporting tool 10' shown in FIG. 13 preferably includes a base plate 12' being approximately L-shaped in a plan view. The supporting bar body 14 is fixed to one main surface of the base plate 12', and the bonding material 16 is disposed on the other main surface thereof, similarly to the above preferred embodiment. Because the base plate 12' of the supporting tool 10' is approximately L-shaped in a plan view, the supporting tool 10' can be fixed to corners of a bath tub B.

A supporting tool 10" also shown in FIG. 13 is different from the supporting tool 10 shown in FIG. 12 in the construction of the supporting bar body 14. The supporting tool 10" includes a pair of narrow supporting members 14a" and 14a". The supporting tool 10" includes a rod-shaped grasping member 14b" extending substantially parallel to the main surface of the base plates 12 and 12. Each of the ends of the rod-shaped grasping member 14b" is supported by each of the narrow supporting members 14a" and 14a" by inserting each of both ends of the rod-shaped grasping member 14b" into each of the supporting members 14a" and 14a".

The supporting tools 10, 10', and 10" are installed at desired positions of a bath room so that they are grasped by children, old people, handicapped people, adults who give infants a bath, and their care providers. FIG. 13 is a plan view showing a bath room in which the supporting tool of this preferred embodiment is used. In this example, the supporting tool 10 is installed on an aluminum frame of a door or on the windowpane thereof as a supporting bar without forming a hole thereon. The supporting tool 10" is installed on a wall surface W close to the entrance of the bath room such that it is substantially parallel with the wall surface W. People can get into the bath room or get out therefrom safely by grasping the supporting tool 10" despite the vicinity of the room entrance being slippery.

Further, people can grasp the supporting tool 10 installed on the wall surface of the bath room when they stand up. Further, the supporting tool 10 can be used as a handrail. That is, in this case, the supporting tool 10 having the grasping member 14b having an appropriate length set according to the longitudinal length of the bath room is installed on the wall surface thereof. People can grasp the supporting tool 10 so that they can walk in the bath room safely.

In addition, people can get into the bath tub B or get out therefrom safely by grasping the supporting tool 10 installed on a floor F continuous with the upper edge of the bath tub B. Moreover, people can get into the bath tub B or get out therefrom safely by grasping the supporting tool 10, installed on a corner of the bath tub B. In particular, because the supporting tool 10' can be mounted on the corner of the bath tub B, it does not form an obstacle to getting into the bath tub B or getting out therefrom. Further, the supporting tool 10 may be mounted on the inner surface of the bath tub B so that people can support themselves therein by grasping it. Furthermore, the supporting tool 10 may be mounted on a wall below a window of the bath room to allow people to see the out of the window by holding it in their hands.

As described above, it is unnecessary to use special tools to install the supporting tool 10 on a desired position of a wall surface or the like and further, even an unskilled person can easily install the supporting tool 10 at any desired position on any surface. Thus, the supporting tool 10 can be installed at a low cost. In addition, because it is not necessary to form a hole in an installation surface, people are not worried about water leakage resulting from installing the support tool 10 on the bath tub B. Furthermore, unlike in the conventional supporting tool, because the supporting tool 10 eliminates the need for the use of an anchor bolt, it is not necessary to install a flange on the installation surface. Thus, the supporting tool 10 appears beautiful and has a simple structure.

The base plate 12 may be made to have any desired shapes, for example, rectangular or triangular in a plan view. The base plate 12 may be formed of a long and narrow metal plate, and the supporting members 14a and 14a of the supporting bar body 14 may be integrated with the long and narrow base plate 12 at positions proximate to both ends thereof.

Figure 14A:
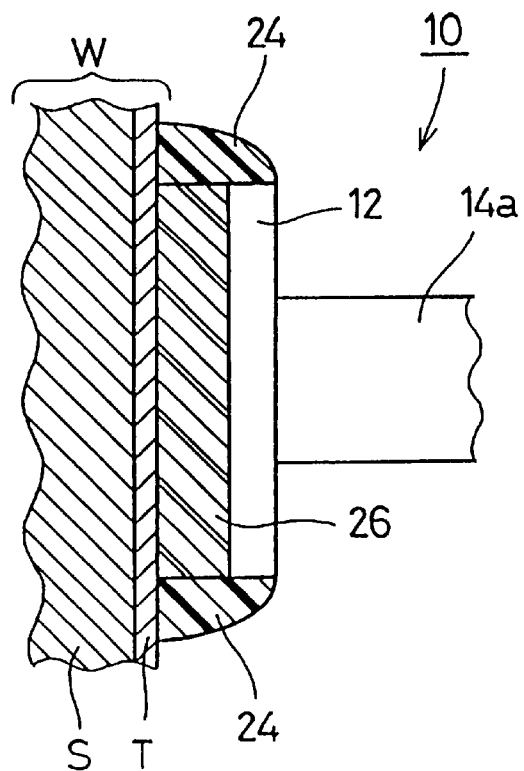
FIG. 14A is a sectional view showing still another preferred embodiment of the present invention.

As shown in FIG. 14A, as the bonding means, only a layer comprising a building adhesive agent 26 and not including the base material 18 may be formed on the other main surface of the base plate 12.

It is possible to cover the surface of the bonding material 16 and the building adhesive agent 26 both serving as the bonding means with a release sheet and remove it therefrom when the supporting tool 10 is installed on the installation surface.

In the above preferred embodiment, the supporting tool 10 is used in the bath room, but may be installed on a wall surface of a toilet or on a stool.

Figure 14B:
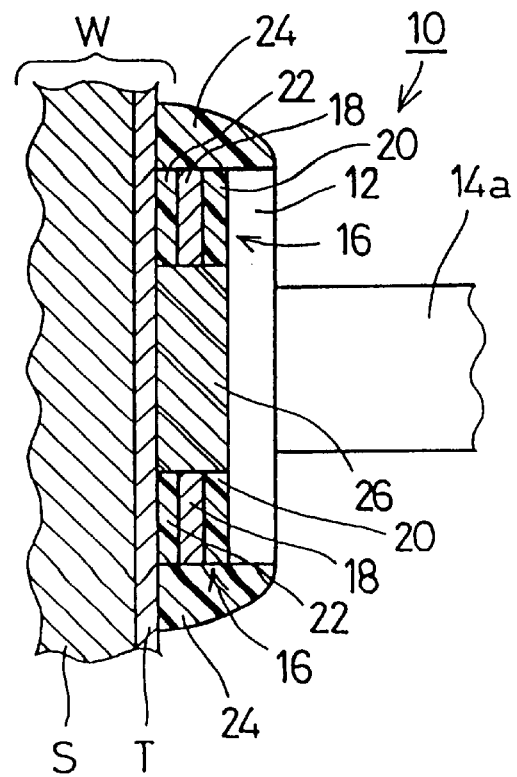
FIG. 14B is a sectional view showing still another preferred embodiment of the present invention.
Figure 15A:
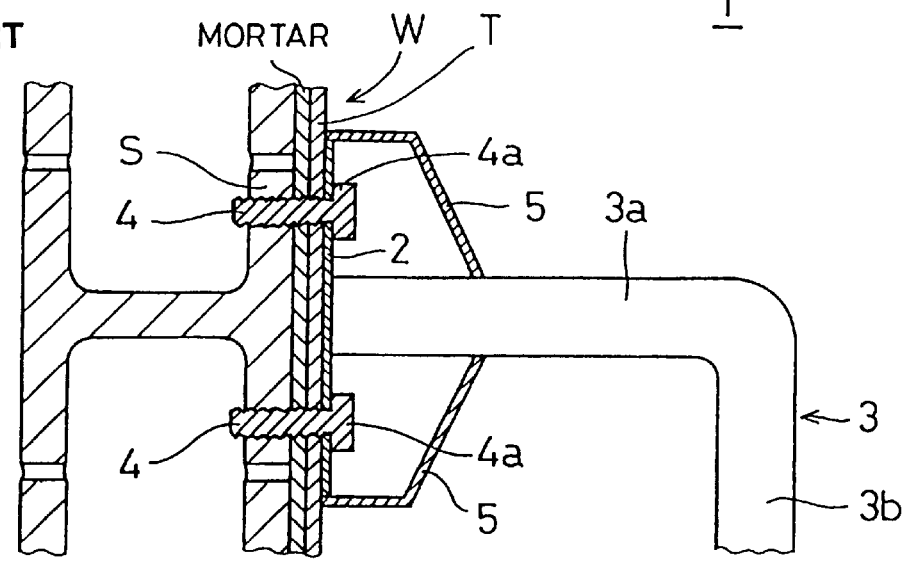
FIG. 15A is a sectional view showing an example of a conventional supporting tool.
Figure 15B:
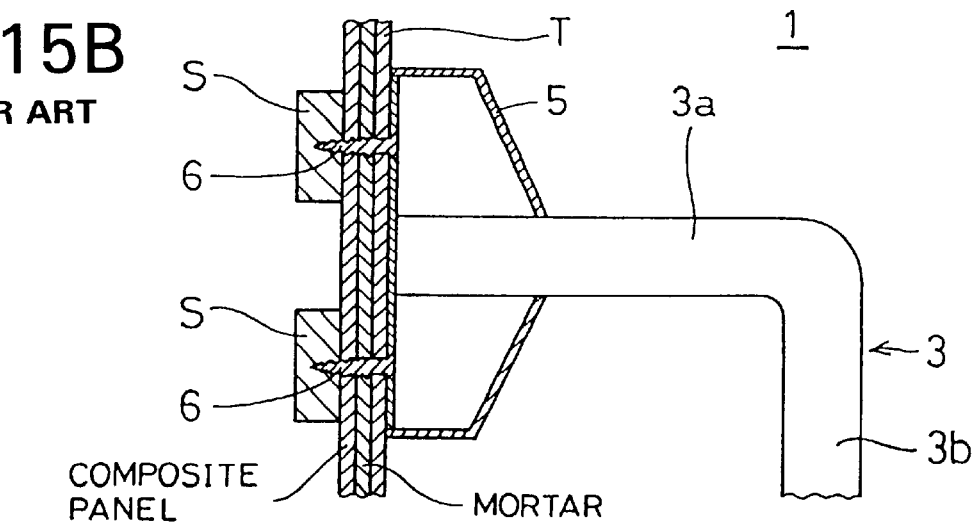
FIG. 15B is a sectional view showing another example of a conventional supporting tool.
Figure 15C:
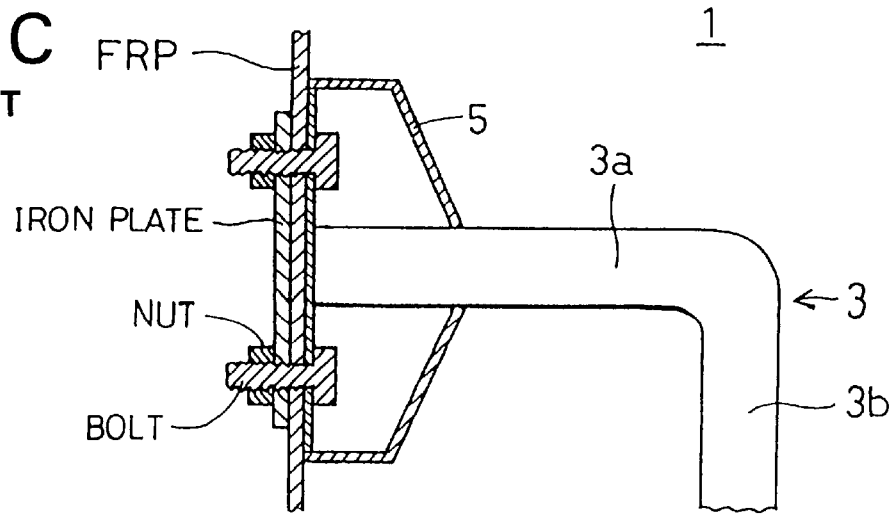
FIG. 15C is a sectional view showing different example of a conventional supporting tool.
Figure 16A:
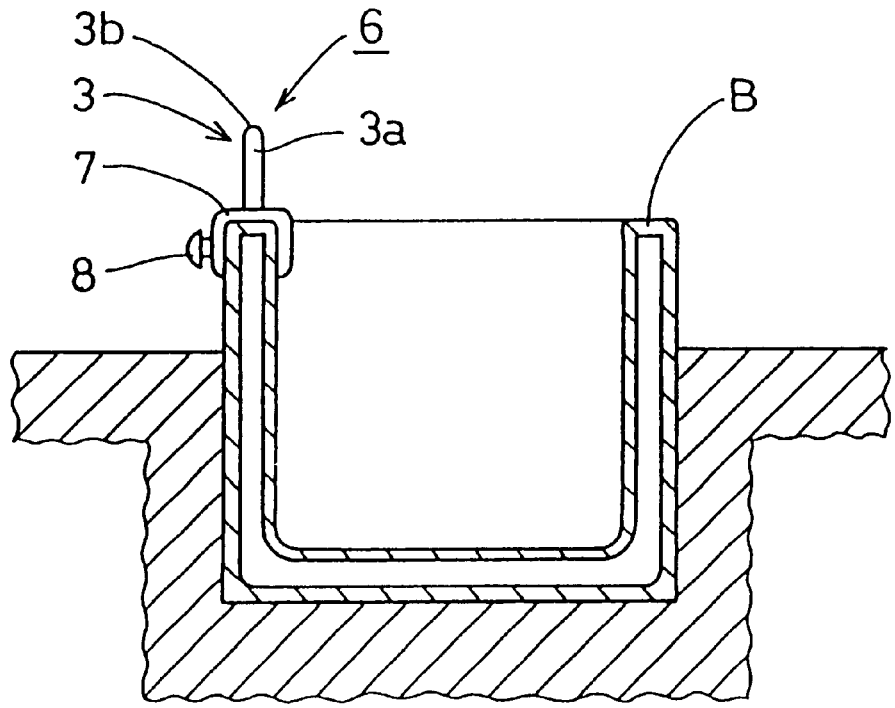
FIG. 16A is a sectional view showing another example of a conventional supporting tool.
Figure 16B:
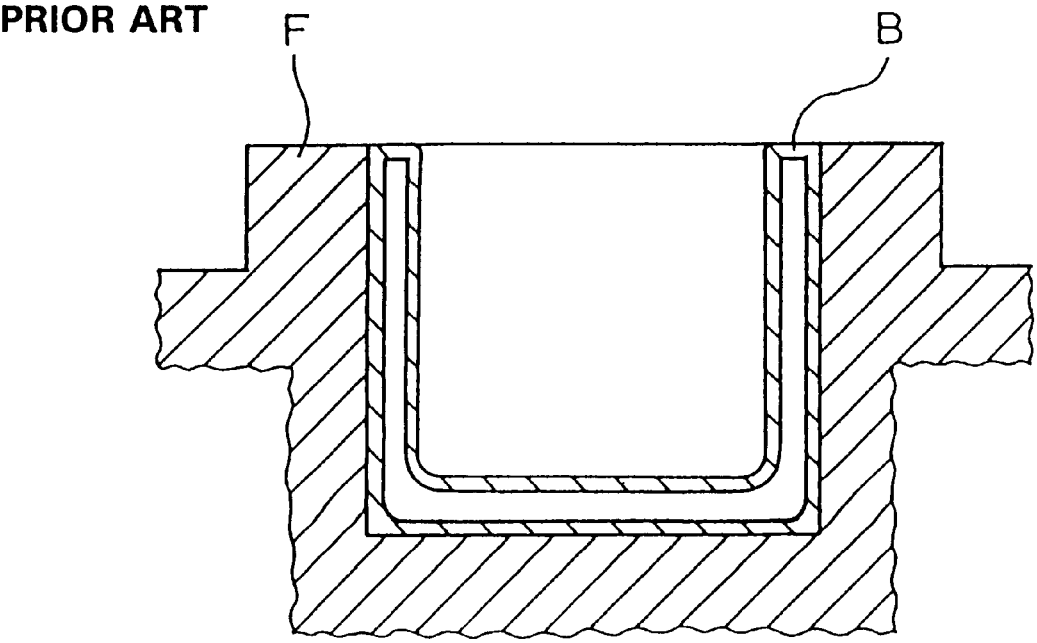
FIG. 16B is a sectional view showing an installation state of a bath room.

FIG. 14B is a sectional view showing still another preferred embodiment of the present invention. A supporting tool 10 shown in FIG. 14B is different from the supporting tool 10 shown in FIG. 12 in its bonding means to be formed on the other main surface of the base plate 12. The bonding means of the supporting tool 10 shown in FIG. 14B includes the bonding material 16 and the building adhesive agent 26. The layer 26 comprising the building adhesive agent is applied to approximately the middle of the other main surface of the base plate 12. The building adhesive agent 26 may be applied to the other main surface of the base plate 12 in advance or immediately before installing the supporting tool 10 on the installation surface. When the building adhesive agent 26 is applied to the rear surface (the other main surface) of the base plate 12 in advance, the adhesive agent is preferably covered with a release liner to prevent the adhesive agent from being dried/hardened until the supporting tool 10 is installed on the installation surface.

The bonding material 16 is preferably formed to have a three-layer construction including the base material 18, the first adhesive agent layer 20, and the second adhesive agent layer 22, similarly to the preferred embodiment shown in FIG. 12. The first adhesive agent layer 20 is used to fix the base material 18 to the base plate 12. The second adhesive agent layer 22 comprising a pressure-sensitive adhesive agent is used to bond the base material 18 to the installation surface temporarily. In this preferred embodiment, the bonding material 16 is formed in such a manner that it surrounds the periphery of the building adhesive agent 26 applied to the rear surface of the base plate 12. In this case, the layer of the building adhesive agent 26 is substantially annular in a front view.

In the preferred embodiment shown in FIG. 14B, the base plate 12 can be temporarily attached to a predetermined position of the installation surface by means of the bonding material 16. Therefore, even though the viscosity of the adhesive agent is low because it is not hardened, the supporting tool 10 can be held at the predetermined position by means of the bonding material 16 until the adhesive agent is dried/hardened. That is, if the bonding material 16 is not formed on the base plate 12, there is a possibility that the building adhesive agent 26 flows onto the installation surface before the adhesive agent is hardened if the viscosity of the building adhesive agent 26 is low. As a result, the base plate 12 is dislocated from the predetermined position. In order to prevent such an inconvenience, it is conceivable to prepare a fixing means separate from the supporting tool 10 so as to fix the base plate 12 to the installation surface until the building adhesive agent 26 is completely dried/hardened. But the preparation of the fixing means does not facilitate the installing operation. In this preferred embodiment, it is not necessary to prepare the fixing means. In this preferred embodiment, the supporting tool 10 can be retained in a selected position by fixing the base plate 12 to the predetermined position temporarily by means of the bonding material 16 until the building adhesive agent 26 is dried/hardened. Thus, the installing operation can be facilitated.

In this preferred embodiment, the supporting tool 10 can be firmly fixed to the installation surface in cooperation with the bonding material 16 and the building adhesive agent 26 after the building adhesive agent 26 is dried/hardened.

It will be apparent from the foregoing that, while the present invention has been described in detail and illustrated with respect to the preferred embodiments thereof, these preferred embodiments are only particular illustrations and examples and the present invention is not limited to these, the spirit and scope of the present invention is limited only by the appended claims.

What is claimed is:

1. A supporting tool comprising:
    a sucking pad adapted to be removably suction mounted to an installation surface and including first and second main surfaces;
    a connection member having a first end and a second end, the first end of the connection member being connected to and extending substantially perpendicularly from the second main surface of the sucking pad and the second end being connected to a cam such that an operating rod may be temporarily inserted into the cam to apply a pulling force to the sucking pad via the connection member;
    a pedestal arranged such that the second end of the connection member passes through an opening in the pedestal and having an annular portion engageable with and unattached to an outer annular periphery of the second main surface of the sucking pad for engaging an outer periphery of the second main surface of the sucking pad to form a seal with the installation surface;
    a supporting bar body which is connected to the pedestal and is adapted to be grasped by a person;
    an adhesive agent layer disposed on the first main surface of the sucking pad and the second main surface thereof and fixing at least one of the pedestal and the sucking pad to the installation surface; and
    an annular recess located within said annular portion between said pedestal and said sucking pad and arranged such that an excess amount of said adhesive agent is accommodated in said recess when the sucking pad is suction mounted to the installation surface.

2. The supporting tool according to claim 1, wherein the adhesive agent layer is disposed between the pedestal and the second main surface of the sucking pad and on the first main surface of the sucking pad.

3. A supporting tool comprising:
    a sucking pad made of an elastic material and adapted to be removably suction-mounted to an installation surface, the sucking pad having first and second main surfaces;
    a connection member having a first end and a second end, the first end of the connection member extending substantially perpendicularly from and connected to the second main surface of the sucking pad;
    a pedestal having a pressing portion including a substantially annular projection member which is arranged to contact a periphery of the sucking pad, the connection member being inserted through the pedestal;
    a supporting bar body connected to the pedestal and which is adapted to be grasped by a person;
    an adhesive agent layer disposed on at least one surface of the sucking pad and fixing the sucking pad to the installation surface;
    a rotatable member mounted on the pedestal and being movable to move the periphery of the sucking pad against the installation surface and to move the connection member in a direction perpendicularly toward and away from the second main surface, such that the sucking pad is elastically deformed to form a negative pressure portion, with the adhesive agent layer interposed between the installation surface and the sucking pad, said rotatable member being rotatably connected to said connection member such that said connection member is vertically movable in the direction in which the connection member extends; and
    a recess located between said pedestal and said sucking pad and arranged such that an excess amount of said adhesive agent is accommodated in said recess when the sucking pad is suction mounted to the installation surface.

4. The supporting tool according to claim 2, wherein the adhesive agent layer is disposed between the pedestal and the second main surface of the sucking pad and on the first main surface of the sucking pad.

5. A method of installing a supporting tool including a sucking pad, at a desired position on an installation surface, the method comprising the steps of:

determining the desired position on which the supporting tool is to be installed;

marking the installation surface at the desired position utilizing a positioning member having a releasable and re-adhesive agent disposed on a rear surface thereof and having a cut-out portion with a substantially semi-circular shape, which substantially supports a lower end portion of the sucking pad during positioning;

temporarily attaching the supporting tool on the installation surface at the marked position via the sucking pad so as to confirm its desired position;

removing the supporting tool from the installation surface;

applying adhesive agent to one main surface of the sucking pad; and re-attaching the sucking pad containing the adhesive agent to the installation surface as determined by the mark indicating the desired position and drying or hardening the adhesive agent.

* * * * *